United States Patent
Kim

(10) Patent No.: US 8,494,366 B2
(45) Date of Patent: Jul. 23, 2013

(54) WAVELENGTH DIVISION MULTIPLEXING-PASSIVE OPTICAL NETWORK USING EXTERNAL SEED LIGHT SOURCE

(75) Inventor: Byoung Whi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/746,568

(22) PCT Filed: Dec. 16, 2008

(86) PCT No.: PCT/KR2008/007431
§ 371 (c)(1),
(2), (4) Date: Jun. 7, 2010

(87) PCT Pub. No.: WO2009/082113
PCT Pub. Date: Jul. 2, 2009

(65) Prior Publication Data
US 2010/0278535 A1    Nov. 4, 2010

(30) Foreign Application Priority Data
Dec. 21, 2007  (KR) .................. 10-2007-0135747
Jul. 23, 2008  (KR) .................. 10-2008-0071906

(51) Int. Cl.
*H04J 14/00*    (2006.01)
(52) U.S. Cl.
USPC ............ 398/72; 398/71; 398/67; 398/68

(58) Field of Classification Search
USPC .................... 398/41–79, 99, 100
See application file for complete search history.

(56) References Cited

U.S. PATENT DOCUMENTS

| | | | |
|---|---|---|---|
| 7,319,818 B2 * | 1/2008 | Lee et al. | 398/70 |
| 8,290,370 B2 * | 10/2012 | Lee et al. | 398/72 |
| 8,369,706 B2 * | 2/2013 | Sorin | 398/72 |
| 2005/0276602 A1 * | 12/2005 | Shin et al. | 398/70 |
| 2006/0008202 A1 | 1/2006 | Shin et al. | |
| 2006/0147211 A1 * | 7/2006 | Kim et al. | 398/72 |
| 2008/0232807 A1 | 9/2008 | Lee et al. | |

FOREIGN PATENT DOCUMENTS

| | | |
|---|---|---|
| KR | 1020050092680 A | 9/2005 |
| KR | 1020060100127 A | 9/2006 |
| KR | 1020080085994 A | 9/2008 |
| WO | 2007/133000 A1 | 11/2007 |
| WO | WO 2007/133000 A1 * | 11/2007 |

OTHER PUBLICATIONS

International Search Report: PCT/KR2008/007431.

* cited by examiner

*Primary Examiner* — M. R. Sedighian
(74) *Attorney, Agent, or Firm* — Ladas & Parry LLP

(57) ABSTRACT

Provided are a wavelength division multiplexing-passive optical network (WDM-PON) in which a reflective semiconductor optical amplifier (RSOA) is used as each optical transmitter of an optical line termination (OLT) and an optical network unit (ONU) and additional spectrum-sliced light is injected into RSOAs of each of the OLT and the ONU, and a WDM-PON that is combined with time division multiple access (TDMA) technology, by which the number of included ONUs increases and conventional TDMA ONUs can be used.

11 Claims, 12 Drawing Sheets

WAVELENGTH DIVISION MULTIPLEXING-PASSIVE OPTICAL NETWORK USING EXTERNAL SEED LIGHT SOURCE

TECHNICAL FIELD

The present invention relates to optical communication, and more particularly, to a wavelength division multiplexing-passive optical network (WDM-PON).

The present invention is derived from a research project supported by the Information Technology (IT) Research & Development (R&D) program of the Ministry of Information and Communication (MIC) and the Institute for Information Technology Advancement (IITA) [2007-S-041-01, Metro-Access Integrated Optical Network Technology].

BACKGROUND ART

A dense wavelength division multiplexing-passive optical network (DWDM-PON) is widely regarded as an ultimate optical network of a next generation. The most important subject to consider with regard to wavelength division multiplexing-passive optical network (WDM-PON) technology is that, although a plurality of optical wavelengths are used, an optical transmission module has to be independent of wavelength. The WDM-PON technology, satisfying the above condition, is being internationally studied and, from among various types of WDM-PONs, two types of WDM-PONs: a wavelength locking WDM-PON and a wavelength reuse WDM-PON, have been developed to a commercial level.

The wavelength locking WDM-PON uses a phenomenon that, if seed light from an external seed light source is injected into a particular Fabry Perot-laser diode (FP-LD), only light having a wavelength corresponding to that of the seed light is amplified and light having different wavelengths than that of the seed light are suppressed. In this case, a broadband light source (BLS) is used as the seed light source. In the wavelength locking WDM-PON, two types of BLSes are located in a base station. In more detail, one BLS provides seed light to an FP-LD included in an optical line termination (OLT) that is a base station optical device, and the other BLS provides seed light to an FP-LD included in an optical network unit (ONU) that is a subscriber side optical device.

A spectrum of light transmitted from a BLS is sliced while the light passes through a wavelength division multiplexing multiplexer (WDM MUX) included in the OLT and a WDM MUX included in a remote node (RN), and spectrum-sliced seed light is injected into an FP-LD. Meanwhile, the FP-LD has a strong polarization characteristic and thus seed light not having a polarization characteristic has to be used. In general, a spectral width of spectrum-sliced seed light is large and thus long distance transmission is restrictive due to dispersion of an optical signal.

The wavelength reuse WDM-PON uses a reflective semiconductor optical amplifier (RSOA) as a light source for communication. An optical signal having downstream data transmitted from the OLT loses the downstream data by an RSOA included in the ONU so as to be converted into continuous wave (CW) light. The CW light is modulated into upstream data so as to be transmitted to the OLT. Thus, a modulated optical signal transmitted from the OLT to the ONU functions as seed light in the RSOA included in the ONU. Meanwhile, an RSOA included in the OLT also requires seed light and, in general, an external light source is used. An RSOA device has a weak polarization characteristic and thus seed light having a strong polarization characteristic can be used. However, downstream data included in a modulated downstream optical signal cannot be completely removed by the ONU and thus a downstream optical signal component remaining in an upstream optical signal deteriorates a quality of upstream transmission.

DISCLOSURE OF INVENTION

Technical Problem

The present invention provides a wavelength division multiplexing-passive optical network (WDM-PON) in which a reflective semiconductor optical amplifier (RSOA) is used as each optical transmitter of an optical line termination (OLT) and an optical network unit (ONU) and additional spectrum-sliced light is injected into RSOAs of each of the OLT and the ONU.

The present invention also provides a WDM-PON that is combined with time division multiple access (TDMA) technology, by which the number of included ONUs increases and conventional TDMA ONUs can be used.

Technical Solution

According to an aspect of the present invention, there is provided a wavelength division multiplexing-passive optical network (WDM-PON) including an optical line termination (OLT) unit which is located in a base station, transmits downstream optical signals to a subscriber side, and receives upstream optical signals transmitted from the subscriber side; an optical network unit (ONU) unit which is located at the subscriber side, receives the downstream optical signals from the OLT unit, and transmits the upstream optical signals to the OLT unit; a seed light source module which is located in the base station and provides spectrum-sliced and wavelength-multiplexed seed light to the OLT unit and the ONU unit; and a remote node (RN) which wavelength-divides the downstream optical signals transmitted from the OLT unit so as to output the wavelength-divided downstream optical signals to the ONU unit, and wavelength-multiplexes the upstream optical signals transmitted from the ONU unit so as to output the wavelength-multiplexed upstream optical signals to the OLT unit, wherein optical transmitters of the OLT unit and the ONU unit respectively generate the downstream and upstream optical signals by using the seed light.

The OLT unit may include a plurality of optical transceivers each of which comprises an optical transmitter transmitting a downstream optical signal having downstream data, an optical receiver receiving an upstream optical signal, and a wavelength filter dividing the upstream and downstream optical signals from each other; an optical wavelength multiplexer (MUX) which wavelength-multiplexes the downstream optical signals having different wavelengths and wavelength-divides the upstream optical signals which are wavelength-multiplexed; and an optical distributor which divides the seed light so as to transmit the divided seed light to the OLT unit and the ONU unit, transmits the downstream optical signals, which are transmitted from the OLT unit, to the ONU unit, and transmits the upstream optical signals, which are transmitted from the ONU unit, to the OLT unit.

Also, the RN may include an optical wavelength MUX which wavelength-divides the downstream optical signals which are wavelength-multiplexed and are received from the OLT unit and wavelength-multiplexes the upstream optical signals which have different wavelengths and are received from the ONU unit. In addition, the RN may further include an optical power splitter which power-splits the downstream optical signals which are wavelength-divided by the optical wavelength MUX so as to transmit the power-split downstream optical signals to at least two optical transceivers of the ONU unit, and combines upstream optical signals transmitted from the at least two optical transceivers of the ONU unit so as to input the combined upstream optical signals to the optical wavelength MUX.

The ONU unit may include a plurality of optical transceivers each of which comprises an optical transmitter transmitting an upstream optical signal having upstream data, an optical receiver receiving a downstream optical signal, and a wavelength filter dividing the upstream and downstream optical signals from each other. A reflective semiconductor optical amplifier (RSOA), which receives the seed light and generates the downstream or upstream optical signal, may be used as each of the optical transmitters of the OLT unit or the ONU unit.

Meanwhile, the seed light source module may include a downstream seed light source module which transmits spectrum-sliced and wavelength-multiplexed seed light to the optical transmitters of the OLT unit; and an upstream seed light source module which transmits spectrum-sliced and wavelength-multiplexed seed light to the optical transmitters of the ONU unit.

The OLT unit and the RN may be connected to each other with a single feeder fiber or two feeder fibers.

If the OLT unit and the RN are connected to each other with a single feeder fiber, the optical distributor may include a first wavelength filter which is connected to an optical wavelength MUX of the OLT unit; a second wavelength filter which is connected to the RN; a first optical circulator which is located between the first and second wavelength filters and is connected to the first and second wavelength filters and to a downstream seed light source module of the seed light source module; and a second optical circulator which is located between the first and second wavelength filters and is connected to the first and second wavelength filters and to an upstream seed light source module of the seed light source module.

As such, if the OLT unit and the RN are connected to each other with a single feeder fiber, the optical distributor may receive spectrum-sliced and wavelength-multiplexed seed light from the downstream seed light source module through a first port which is connected to the downstream seed light source module, so as to output the seed light to a third port which is connected to the optical wavelength MUX, through the first optical circulator and the first wavelength filter, may receive spectrum-sliced and wavelength-multiplexed seed light from the upstream seed light source module through a second port which is connected to the upstream seed light source module, so as to output the seed light to a fourth port which is connected to the RN, through the second optical circulator and the second wavelength filter, may receive the downstream optical signals from the OLT unit through the third port so as to output the downstream optical signals to the fourth port through the first wavelength filter, the first optical circulator, and the second wavelength filter, and may receive the upstream optical signals from the ONU unit through the fourth port so as to output the upstream optical signals to the third port through the second wavelength filter, the second optical circulator, and the first wavelength filter.

Meanwhile, if the OLT unit and the RN are connected to each other with two feeder fibers, the optical distributor may include a first wavelength filter which is connected to an optical wavelength MUX of the OLT unit; a first optical circulator which is connected to the first wavelength filter, the downstream seed light source module, and one of the two feeder fibers; and a second optical circulator which is connected to the first wavelength filter, the upstream seed light source module, and the other one of the two feeder fibers.

As such, if the OLT unit and the RN are connected to each other with two feeder fibers, the optical distributor may receive spectrum-sliced and wavelength-multiplexed seed light from the downstream seed light source module through a first port which is connected to the downstream seed light source module, so as to output the seed light to a third port which is connected to the optical wavelength MUX, through the first optical circulator and the first wavelength filter, may receive spectrum-sliced and wavelength-multiplexed seed light from the upstream seed light source module through a second port which is connected to the upstream seed light source module, so as to output the seed light to a fifth port which is connected to the one of the two feeder fibers, through the second optical circulator, may receive the downstream optical signals from the OLT unit through the third port so as to output the downstream optical signals to a fourth port which is connected to the other one of the two feeder fibers, through the first wavelength filter and the first optical circulator, and may receive the upstream optical signals from the ONU unit through the fifth port so as to output the upstream optical signals to the third port through the second optical circulator and the first wavelength filter.

According to another aspect of the present invention, there is provided a wavelength division multiplexing-passive optical network (WDM-PON) including an optical line termination (OLT) unit which is located in a base station, transmits downstream optical signals to a subscriber side, and receives upstream optical signals transmitted from the subscriber side; an optical network unit (ONU) unit which is located at the subscriber side, receives the downstream optical signals from the OLT unit, and transmits the upstream optical signals to the OLT unit; a seed light source module which is located in the base station and provides spectrum-sliced and wavelength-multiplexed seed light to the OLT unit and the ONU unit; a remote node (RN) which wavelength-divides the downstream optical signals transmitted from the OLT unit so as to output the wavelength-divided downstream optical signals to the ONU unit, and wavelength-multiplexes the upstream optical signals transmitted from the ONU unit so as to output the wavelength-multiplexed upstream optical signals to the OLT unit; and a wavelength conversion device which is located at the subscriber side, wavelength-converts the downstream optical signals to have time division multiple access-passive optical network (TDMA-PON) downstream wavelengths, and outputs the wavelength-converted downstream optical signals to the ONU unit, wherein optical transmitters of the OLT unit and the ONU unit respectively generate the downstream and upstream optical signals by using the seed light.

The RN may include an optical wavelength multiplexer (MUX) which wavelength-divides the downstream optical signals which are wavelength-multiplexed and are received from the OLT unit and wavelength-multiplexes the upstream optical signals which have different wavelengths and are received from the ONU unit; and a wavelength filter which receives the downstream optical signals which are wavelength-divided by the optical wavelength MUX so as to output the downstream optical signals to the wavelength conversion device or receives the upstream optical signals from the ONU unit so as to output the up stream optical signals to the wavelength conversion device, and receives the downstream or upstream optical signals which are wavelength-converted by the wavelength conversion device to have TDMA-PON wavelengths or WDM-PON wavelengths so as to transmit the wavelength-converted downstream or upstream optical signals to the ONU unit or the optical wavelength MUX.

Also, the RN may further include an optical power splitter which is located between the wavelength filter and the ONU unit, power-splits the downstream optical signals output from the wavelength filter so as to transmit the power-split downstream optical signals to at least two optical transceivers of the ONU unit, and combines upstream optical signals transmitted from the at least two optical transceivers of the ONU unit so as to input the combined upstream optical signals to the wavelength filter.

The wavelength conversion device may include a first wavelength filter which is connected to the wavelength filter of the RN; a second wavelength filter which is connected to the first wavelength filter; a third wavelength filter which is connected to the second wavelength filter; a first optical transmitter and a first optical receiver which are connected to the third wavelength filter; a second optical transmitter which is connected to the first wavelength filter and the first optical receiver; and a second optical receiver which is connected to the second wavelength filter and the first optical transmitter, wherein each of the first and second optical transmitters is a reflective semiconductor optical amplifier (RSOA).

Accordingly, the downstream optical signals transmitted from the RN may be input to the first optical receiver through the first, second, and third wavelength filters of the wavelength conversion device so as to be converted into electric signals, the electric signals converted by the first optical receiver may be input to the second optical transmitter so as to be wavelength-converted to have TDMA-PON wavelengths, the wavelength-converted electric signals may be output to the RN through the first wavelength filter, seed light for the upstream optical signals input from the RN may be input to the first optical transmitter through the first, second, and third wavelength filters, upstream optical signals having TDMA-PON wavelengths, which are input from the RN, may be input to the second optical receiver through the first and second wavelength filters so as to be converted into electric signals, the electric signals converted by the second optical receiver may be input to the first optical transmitter so as to be wavelength-converted to have wavelengths of the seed light, and the wavelength-converted electric signals may be output to the RN through the third, second, and first wavelength filters.

The ONU unit may be connected to the wavelength conversion device. In more detail, the ONU may include an optical transmitter transmitting the upstream optical signals having upstream data; an optical receiver receiving the downstream optical signals; and a wavelength filter dividing the upstream and downstream optical signals from each other, and the wavelength conversion device may include a first wavelength filter which is connected to the wavelength filter of the RN; a second wavelength filter and a first optical coupler which are connected to the first wavelength filter; a second optical coupler and a third wavelength filter which are connected to the second wavelength filter; a first optical transmitter and a first optical receiver which are connected to the third wavelength filter; a second optical transmitter which is connected to the first optical coupler and the first optical receiver; a second optical receiver which is connected to the second optical coupler and the first optical transmitter; and a fourth wavelength filter which is connected to the first and second optical couplers and the optical transceiver, wherein each of the first and second optical transmitters is an RSOA.

Meanwhile, if the RN comprises an optical power splitter, the optical transceiver connected to the fourth wavelength filter may be a predetermined optical transceiver which is selected from among a plurality of optical transceivers connected to the same optical power splitter, an upstream optical signal having TDMA-PON wavelengths, which is output from the predetermined optical transceiver, may be input to the second optical coupler through the fourth wavelength filter, and may be combined with other upstream optical signals having TDMA-PON wavelengths, which are output from the second wavelength filter, so as to be input to the second optical receiver, a downstream optical signal having TDMA-PON wavelengths, which is output from the second optical transmitter, may be power-split by the first optical coupler, some power-split optical signals may be input to the RN through the first wavelength filter, and the other power-split optical signals may be input to the predetermined optical transceiver through the fourth wavelength filter, so as to be converted into electric signals.

Advantageous Effects

The WDM-PON using an external seed light source, according to the present invention, uses an RSOA as an optical transmitter of each of an OLT and an ONU and injects the spectrum-sliced light into the RSOA of each of the OLT and the ONU, from a seed light source module located in a base station, and thus, may solve the problems that downstream information included in a modulated downstream optical signal cannot be completely removed in an ONU and components of the downstream optical signal, which remain in an upstream optical signal, can deteriorate a quality of upstream data transmission. That is, an ideal wavelength-independent WDM-PON may be implemented.

Furthermore, a WDM-PON using an external seed light source, according to the present invention, may increase the number of ONUs by using an optical power splitter and may use conventional TDMA ONUs by using a wavelength conversion device.

DESCRIPTION OF DRAWINGS

The above and other features and advantages of the present invention will become more apparent by describing in detail exemplary embodiments thereof with reference to the attached drawings in which.

BEST MODE

Figure 1A:
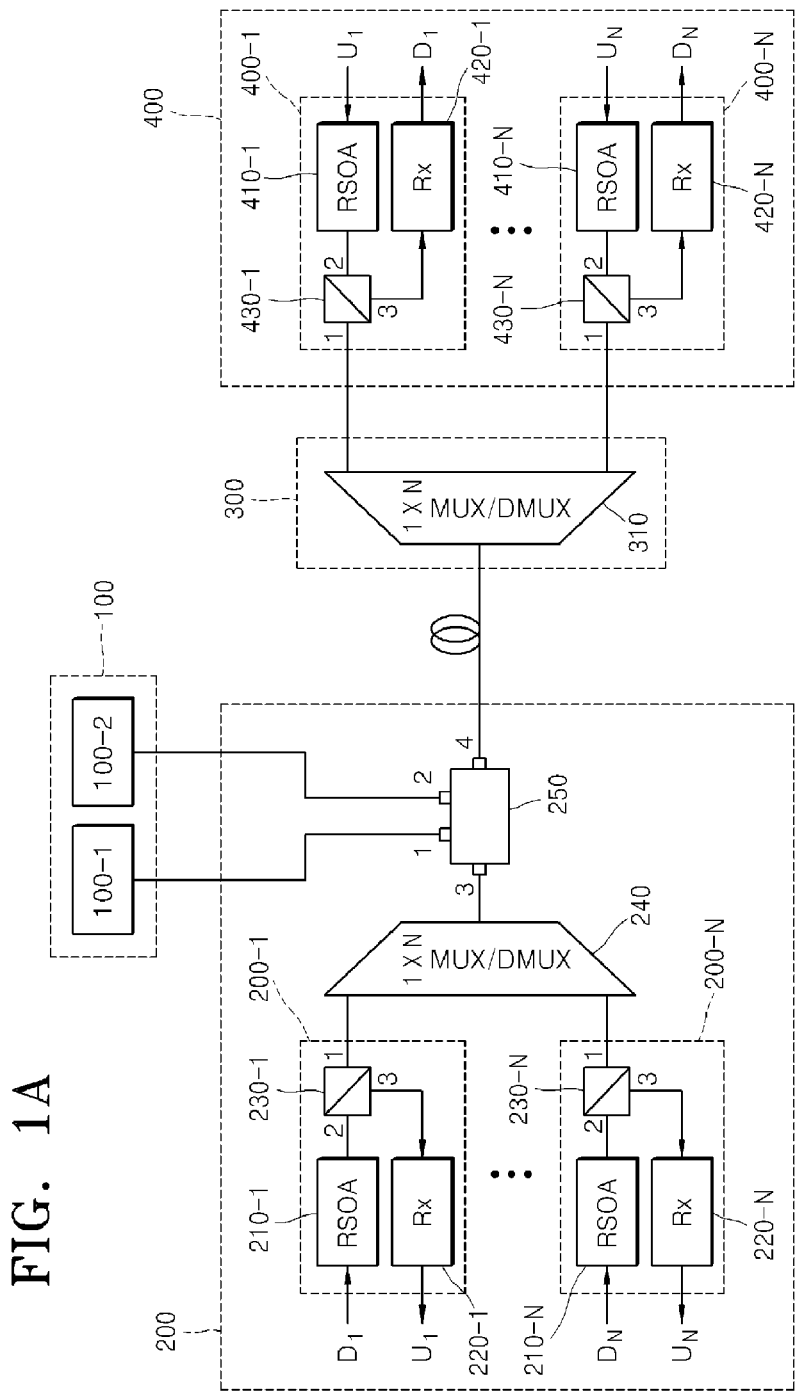
FIG. 1A is a structural diagram of a wavelength division multiplexing-passive optical network (WDM-PON) in which additional external seed light is used for an optical line termination (OLT) optical transmitter and an optical network unit (ONU) optical transmitter, according to an embodiment of the present invention.

Hereinafter, the present invention will be described in detail by explaining embodiments of the invention with reference to the attached drawings. It will be understood that when an element is referred to as being 'on' another element, it can be directly on the other element, or an intervening element may also be present. In the drawings, the thicknesses or sizes of elements are exaggerated for convenience and clarity of explanation and parts unrelated to the description are omitted. Like reference numerals in the drawings denote like elements. Meanwhile, terms used to describe the present invention are for descriptive purposes only and are not intended to limit the scope of the invention.

FIG. 1A is a structural block diagram of a wavelength division multiplexing-passive optical network (WDM-PON) in which additional external seed light is used for an optical line termination (OLT) optical transmitter and an optical network unit (ONU) optical transmitter, according to an embodiment of the present invention.

Referring to FIG. 1A, the WDM-PON, according to the current embodiment of the present invention, includes an OLT unit 200 that is located in a base station, an ONU unit 400 that is located at a subscriber side, a seed light source module 100 that is also located in the base station, and a remote node (RN) 300 that is located in a remote area and connects the OLT unit 200 and the ONU unit 400.

The OLT unit 200 includes first through Nth OLTs 200-1 through 200-N or first through Nth optical transceivers, an optical wavelength multiplexer (MUX) 240, and an optical distributor 250, where N is an integer greater than one. The first through Nth OLTs 200-1 through 200-N respectively include first through Nth optical transmitters 210-1 through 210-N, first through Nth optical receivers 220-1 through 220-N, and first through Nth wavelength filters 230-1 through 230-N. Hereinafter, each of the first through Nth optical transmitters 210-1 through 210-N is representatively referred to as an optical transmitter 210, each of the first through Nth optical receivers 220-1 through 220-N is representatively referred to as an optical receiver 220, and each of the first through Nth wavelength filters 230-1 through 230-N is representatively referred to as a wavelength filter 230. The optical transmitter 210 transmits a downstream optical signal having downstream data, the optical receiver 220 receives an upstream optical signal, and the wavelength filter 230 divides upstream and downstream optical signals from each other. Meanwhile, the reflective semiconductor optical amplifier (RSOA) that is described above in the Description of the Related Art section, may be used as the optical transmitter 210 of the OLT unit 200.

The ONU unit 400 includes first through Nth ONUs 400-1 through 400-N or first through Nth optical transceivers. The first through Nth ONUs 400-1 through 400-N respectively include first through Nth optical transmitters 410-1 through 410-N, first through Nth optical receivers 420-1 through 420-N, and first through Nth wavelength filters 430-1 through 430-N. Hereinafter, each of the first through Nth optical transmitters 410-1 through 410-N is representatively referred to as an optical transmitter 410, each of the first through Nth optical receivers 420-1 through 420-N is representatively referred to as an optical receiver 420, and each of the first through Nth wavelength filters 430-1 through 430-N is representatively referred to as a wavelength filter 430. The optical transmitter 410 transmits an upstream optical signal having upstream data, the optical receiver 420 receives a downstream optical signal, and the wavelength filter 430 divides upstream and downstream optical signals from each other. Meanwhile, the RSOA that is described above in the Description of the Related Art section, may be used as the optical transmitter 410 of the ONU unit 400.

The optical wavelength MUX 240 wavelength-multiplexes downstream optical signals having different wavelengths and wavelength-divides the upstream optical signals which are wavelength-multiplexed. The optical distributor 250 transmits seed light that is input from the seed light source module 100, to each of the optical transmitter 210 of the OLT unit 200 and the optical transmitter 410 of the ONU unit 400, transmits the downstream optical signal, transmitted from the optical transmitter 210 of the OLT unit 200, to the ONU unit 400, and transmits the upstream optical signal, transmitted from the ONU unit 400, to the optical receiver 220 of the OLT unit 200.

The RN 300 includes an optical wavelength MUX 310 that wavelength-divides wavelength-multiplexed downstream optical signals transmitted from the OLT unit 200 and, simultaneously, wavelength-multiplexes upstream optical signals having different wavelengths and transmitted from the ONU unit 400.

The seed light source module 100 includes a downstream seed light source module 100-1 that transmits spectrum-sliced and wavelength-multiplexed seed light to the optical transmitter 210 of the OLT unit 200, and an upstream seed light source module 100-2 that transmits spectrum-sliced and wavelength-multiplexed seed light to the optical transmitter 410 of the ONU unit 400.

Detailed operations of the OLT unit 200 will now be described.

The spectrum-sliced and wavelength-multiplexed seed light transmitted from the downstream seed light source module 100-1 is input to a first port 1 of the optical distributor 250, is output to a third port 3 of the optical distributor 250, and is input to an output port of the optical wavelength MUX 240 so as to be wavelength-divided. Then, the wavelength-divided seed light is separately input to the first through Nth OLTs 200-1 through 200-N. The wavelength-divided seed light is input to a first port 1 of the wavelength filter 230, is output to a second port 2 of the wavelength filter 230, and is input to the optical transmitter 210 that may be an RSOA.

Seed light input to the optical transmitter 210 is amplified, is modulated by downstream data, and is output from the optical transmitter 210 as the downstream optical signal. The downstream optical signal output from the optical transmitter 210 is input to the second port 2 of the wavelength filter 230, is output to the first port 1 of the wavelength filter 230, and is wavelength-multiplexed together with other downstream optical signals output from the other optical transmitters, by the optical wavelength MUX 240. The wavelength-multiplexed downstream optical signals output from the optical wavelength MUX 240 are input to the third port 3 of the optical distributor 250 and are output to a fourth port 4 of the optical distributor 250. Then, the wavelength-multiplexed downstream optical signals are transmitted to a subscriber side through a feeder fiber.

Meanwhile, wavelength-multiplexed upstream optical signals transmitted from the subscriber side are input to the fourth port 4 of the optical distributor 250 and are output to the third port 3 of the optical distributor 250. The output upstream optical signals are input to the optical wavelength MUX 240 so as to be wavelength-divided, and the wavelength-divided upstream optical signals are separately input to the first through Nth OLTs 200-1 through 200-N. A wavelength-divided upstream optical signal is input to the first port 1 of the wavelength filter 230, is output to a third port 3 of the wavelength filter 230, and is input to the optical receiver 220 so as to be converted into an electric signal.

Detailed operations of the ONU unit 400 will now be described.

Spectrum-sliced and wavelength-multiplexed seed light transmitted from the upstream seed light source module 100-2 is input to a second port 2 of the optical distributor 250, is output to the fourth port 4 of the optical distributor 250, and is input to an output port of the optical wavelength MUX 310 of the RN 300, through the feeder fiber, so as to be wavelength-divided. The wavelength-divided seed light is separately input to the first through Nth ONUs 400-1 through 400-N. The wavelength-divided seed light is input to a first port 1 of the wavelength filter 430, is output to a second port 2 of the wavelength filter 430, and is input to the optical transmitter 410 that may be an RSOA.

Seed light input to the optical transmitter 410 is amplified, is modulated by upstream data, and is output from the optical transmitter 410 as the upstream optical signal. The upstream optical signal output from the optical transmitter 410 is input to the second port 2 of the wavelength filter 430, is output to the first port 1 of the wavelength filter 430, and is wavelength-multiplexed together with upstream optical signals output from the other optical transmitters, by the optical wavelength MUX 310 of the RN 300. The wavelength-multiplexed upstream optical signals output from the optical wavelength MUX 310 are transmitted to the OLT unit 200 through the feeder fiber.

Meanwhile, wavelength-multiplexed downstream optical signals transmitted through the feeder fiber are input to the output port of the optical wavelength MUX 310 of the RN 300 so as to be wavelength-divided, and the wavelength-divided downstream optical signals are separately input to the first through Nth ONUs 400-1 through 400-N. A wavelength-divided downstream optical signal is input to the first port 1 of the wavelength filter 430, is output to a third port 3 of the wavelength filter 430, and is input to the optical receiver 420 so as to be converted into an electric signal.

Figure 1B:
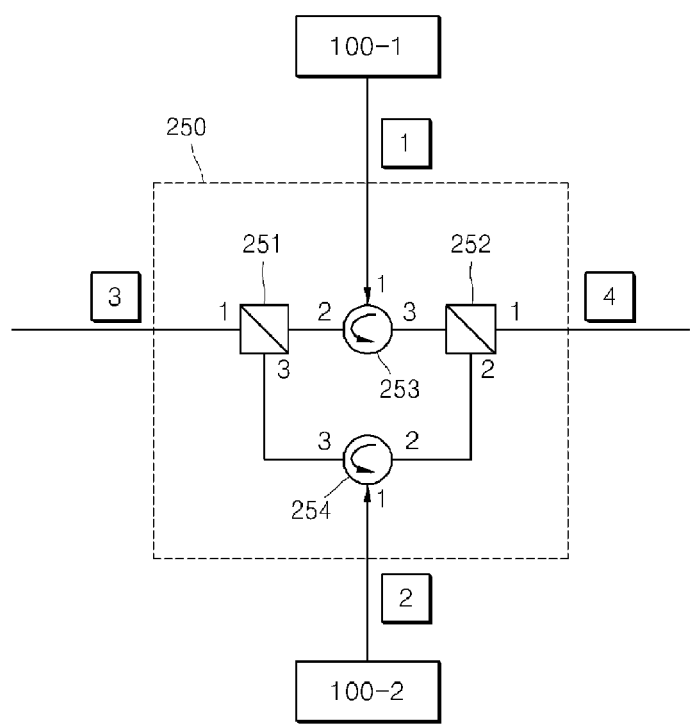
FIG. 1B is a detailed structural block diagram of an optical distributor illustrated in FIG. 1A.

FIG. 1B is a detailed structural diagram of the optical distributor 250 illustrated in FIG. 1A. FIG. 1B will be described in conjunction with FIG. 1A.

Referring to FIG. 1B, the optical distributor 250 includes a first wavelength filter 251, a second wavelength filter 252, a first optical circulator 253, and a second optical circulator 254.

Detailed operations of the optical distributor 250 will now be described.

Spectrum-sliced and wavelength-multiplexed seed light transmitted from the downstream seed light source module 100-1 is input to the first port 1 of the optical distributor 250, is input to a first port 1 of the first optical circulator 253, is output to a second port 2 of the first optical circulator 253, is input to a second port 2 of the first wavelength filter 251, is output to a first port 1 of the first wavelength filter 251, and is ultimately output to the third port 3 of the optical distributor 250 so as to be separately input to the first through Nth OLTs 200-1 through 200-N.

Spectrum-sliced and wavelength-multiplexed seed light transmitted from the upstream seed light source module 100-2 is input to the second port 2 of the optical distributor 250, is input to a first port 1 of the second optical circulator 254, is output to a second port 2 of the second optical circulator 254, is input to a second port 2 of the second wavelength filter 252, is output to a first port 1 of the second wavelength filter 252, and is ultimately output to the fourth port 4 of the optical distributor 250 so as to be separately input to the first through Nth ONUs 400-1 through 400-N through the RN 300.

Downstream optical signals wavelength-multiplexed by the optical wavelength MUX 240 of the OLT unit 200 are input to the third port 3 of the optical distributor 250, are input to the first port 1 of the first wavelength filter 251, are output to the second port 2 of the first wavelength filter 251, are input to the second port 2 of the first optical circulator 253, are output to a third port 3 of the first optical circulator 253, are input to a third port 3 of the second wavelength filter 252, are output to the first port 1 of the second wavelength filter 252, and are ultimately output to the fourth port 4 of the optical distributor 250 so as to be separately input to the first through Nth ONUs 400-1 through 400-N through the RN 300.

Upstream optical signals wavelength-multiplexed by the optical wavelength MUX 310 of the RN 300 are input to the forth port 4 of the optical distributor 250, are input to the first port 1 of the second wavelength filter 252, are output to the second port 2 of the second wavelength filter 252, are input to the second port 2 of the second optical circulator 254, are output to a third port 3 of the second optical circulator 254, are input to a third port 3 of the first wavelength filter 251, are output to the first port 1 of the first wavelength filter 251, and are ultimately output to the third port 3 of the optical distributor 250 so as to be separately input to the first through Nth OLTs 200-1 through 200-N.

Figure 1C:
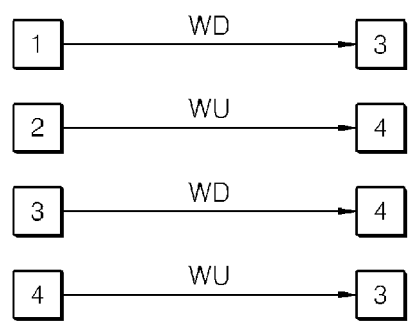
FIG. 1C is a structural diagram showing the flow of optical signals in an optical distributor illustrated in FIG. 1B.

FIG. 1C is a structural diagram showing the flow of optical signals in the optical distributor 250 illustrated in FIG. 1B. FIG. 1C will be described in conjunction with FIG. 1B.

Referring to FIG. 1C, downstream seed light indicated by 'WD' at the top portion of FIG. 1C, is input to the first port 1 of the optical distributor 250 and is output to the third port 3 of the optical distributor 250. Upstream seed light indicated by 'WU' at the second-top portion of FIG. 1C, is input to the second port 2 of the optical distributor 250 and is output to the fourth port 4 of the optical distributor 250. A downstream optical signal indicated by 'WD' at the third-top portion of FIG. 1C, is input to the third port 3 of the optical distributor 250 and is output to the fourth port 4 of the optical distributor 250. An upstream optical signal indicated by 'WU' at the bottom portion of FIG. 1C, is input to the fourth port 4 of the optical distributor 250 and is output to the third port 3 of the optical distributor 250.

In FIG. 1C, 'WD' indicates dense wavelength division multiplexing (DWDM) wavelengths for downstream and 'WU' indicates DWDM wavelengths for upstream.

Figure 2A:
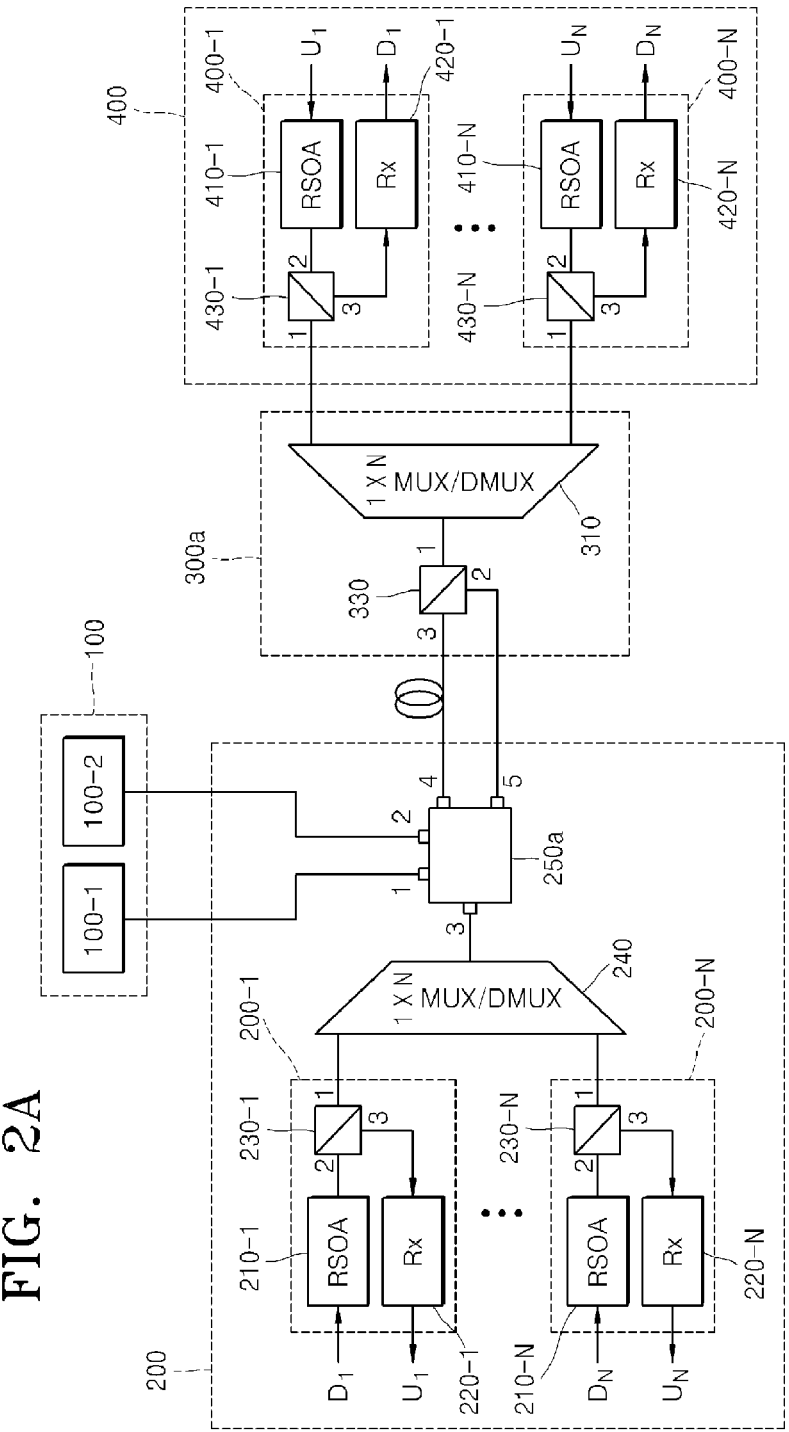
FIG. 2A is a structural block diagram of a WDM-PON in which additional external seed light is used for an OLT optical transmitter and an ONU optical transmitter, according to another embodiment of the present invention.

FIG. 2A is a structural block diagram of a WDM-PON in which additional external seed light is used for an OLT optical transmitter and an ONU optical transmitter, according to another embodiment of the present invention.

Referring to FIG. 2A, the WDM-PON according to the current embodiment of the present invention has a similar structure to the WDM-PON illustrated in FIG. 1A. However, the number of feeder fibers between an OLT unit 200 and an RN 300a is different from that of the WDM-PON illustrated in FIG. 1A. In more detail, two feeder fibers are used in FIG. 2A while a single feeder fiber is used in FIG. 1A. One of the feeder fibers is used for downstream optical signals and the other is used for upstream optical signals.

Meanwhile, if two feeder fibers are used, the RN 300a further includes a wavelength filter 330 for dividing upstream and downstream optical signals from each other, and an optical distributor 250a of the OLT unit 200 has a slightly different structure from the optical distributor 250 illustrated in FIG. 1B. A detailed structure of the optical distributor 250a will be described later with reference to FIG. 2B. The other elements are identical to their corresponding elements illustrated in FIG. 1A and thus detailed descriptions thereof will be omitted here.

Figure 2B:
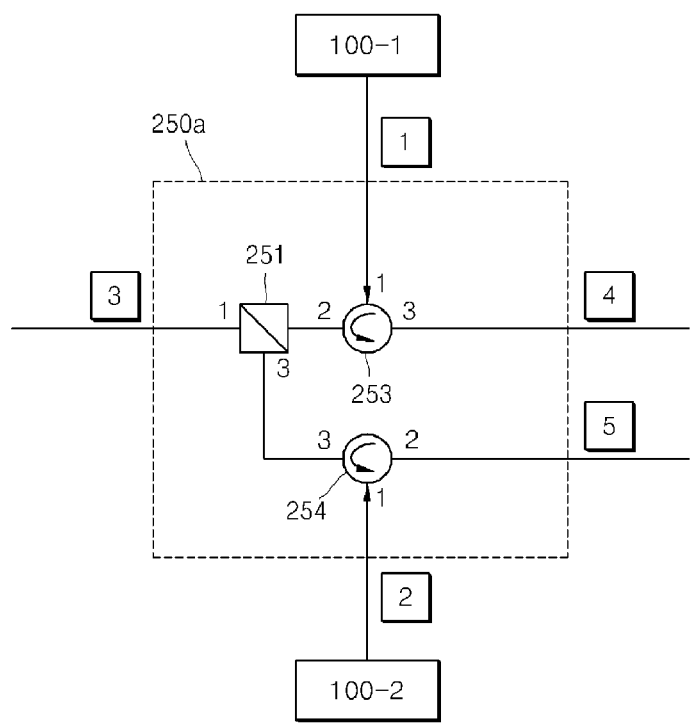
FIG. 2B is a detailed structural diagram of an optical distributor illustrated in FIG. 2A.

FIG. 2B is a detailed structural diagram of the optical distributor 250a illustrated in FIG. 2A. FIG. 2B will be described in conjunction with FIG. 2A.

Referring to FIG. 2B, unlike the optical distributor 250 illustrated in FIG. 1B, the optical distributor 250a, according to the current embodiment of the present invention, includes a first wavelength filter 251, a first optical circulator 253, and a second optical circulator 254.

Detailed operations of the optical distributor 250a will now be described.

Spectrum-sliced and wavelength-multiplexed seed light transmitted from a downstream seed light source module 100-1 is input to a first port 1 of the optical distributor 250a, is input to a first port 1 of the first optical circulator 253, is output to a second port 2 of the first optical circulator 253, is input to a second port 2 of the first wavelength filter 251, is output to a first port 1 of the first wavelength filter 251, and is ultimately output to a third port 3 of the optical distributor 250a.

Spectrum-sliced and wavelength-multiplexed seed light transmitted from an upstream seed light source module 100-2 is input to a second port 2 of the optical distributor 250a, is input to a first port 1 of the second optical circulator 254, is output to a second port 2 of the second optical circulator 254, and is ultimately output to a fifth port 5 of the optical distributor 250a so as to be transmitted to the RN 300a through a first feeder fiber from among the two feeder fibers.

Downstream optical signals wavelength-multiplexed by an optical wavelength MUX 240 of the OLT unit 200 are input to the third port 3 of the optical distributor 250a, are input to the first port 1 of the first wavelength filter 251, are output to the second port 2 of the first wavelength filter 251, are input to the second port 2 of the first optical circulator 253, are output to a third port 3 of the first optical circulator 253, and are ultimately output to a fourth port 4 of the optical distributor 250a so as to be transmitted to the RN 300a through a second feeder fiber from among the two feeder fibers.

Upstream optical signals wavelength-multiplexed by an optical wavelength MUX 310 of the RN 300a are input to the fifth port 5 of the optical distributor 250a through the first feeder fiber, are input to the second port 2 of the second optical circulator 254, are output to a third port 3 of the second optical circulator 254, are input to a third port 3 of the first wavelength filter 251, are output to the first port 1 of the first wavelength filter 251, and are ultimately output to the third port 3 of the optical distributor 250a.

The wavelength filter 330 included in the RN 300a performs functions of the second wavelength filter 252 illustrated in FIG. 1B so as to divide upstream and downstream optical signals from each other.

In more detail, wavelength-multiplexed downstream optical signals transmitted through the second feeder fiber are input to a third port 3 of the wavelength filter 330 included in the RN 300a, and are output to a first port 1 of the wavelength filter 330 so as to be wavelength-divided by the optical wavelength MUX 310 of the RN 300a. The wavelength-divided downstream optical signals are separately transmitted to first through Nth ONUs 400-1 through 400-N. Meanwhile, upstream optical signals having different wavelengths and transmitted from the first through Nth ONUs 400-1 through 400-N are input to the optical wavelength MUX 310 of the RN 300a so as to be wavelength-multiplexed. The wavelength-multiplexed upstream optical signals are input to the first port 1 of the wavelength filter 330, and are output to a second port 2 of the wavelength filter 330 so as to be transmitted to the OLT unit 200 through the first feeder fiber and the fifth port 5 of the optical distributor 250a.

Figure 2C:
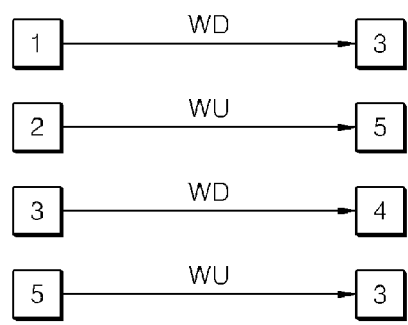
FIG. 2C is a structural diagram showing the flow of optical signals in an optical distributor illustrated in FIG. 2B.

FIG. 2C is a structural diagram showing the flow of optical signals in the optical distributor 250a illustrated in FIG. 2B. FIG. 2C will be described in conjunction with FIG. 2B.

Referring to FIG. 2C, downstream seed light, indicated by 'WD' at the top portion of FIG. 2C, is input to the first port 1 of the optical distributor 250a and is output to the third port 3 of the optical distributor 250a. Upstream seed light, indicated by 'WU' at the second-top portion of FIG. 2C, is input to the second port 2 of the optical distributor 250a and is output to the fifth port 5 of the optical distributor 250a. A downstream optical signal, indicated by 'WD' at the third-top portion of FIG. 2C, is input to the third port 3 of the optical distributor 250a and is output to the fourth port 4 of the optical distributor 250a. An upstream optical signal, indicated by 'WU' at the bottom portion of FIG. 2C, is input to the fifth port 5 of the optical distributor 250a and is output to the third port 3 of the optical distributor 250a.

Definitely, the fourth port 4 of the optical distributor 250a is connected to the second feeder fiber and the fifth port 5 of the optical distributor 250a is connected to the first feeder fiber.

Figure 3:
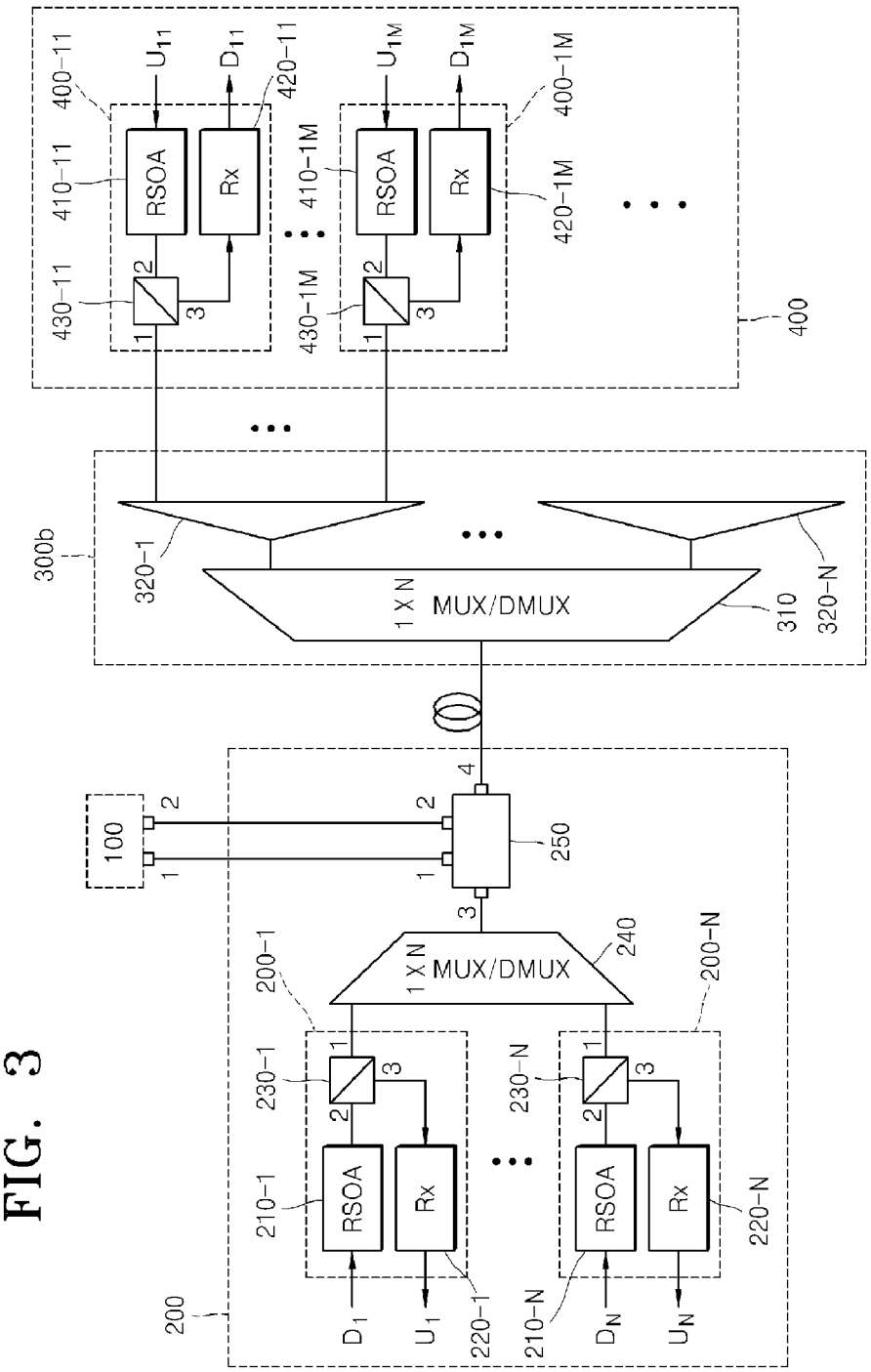
FIG. 3 is a structural block diagram of a WDM-PON in which additional external seed light is used for an OLT optical transmitter and an ONU optical transmitter, according to another embodiment of the present invention.

FIG. 3 is a structural block diagram of a WDM-PON in which additional external seed light is used for an OLT optical transmitter and an ONU optical transmitter, according to another embodiment of the present invention.

Referring to FIG. 3, the WDM-PON, according to the current embodiment of the present invention, has a structure suitable for time division multiple access (TDMA) subscribers. Most parts of the structure are similar to the WDM-PON illustrated in FIG. 1A. However, a difference exists in that, in addition to an optical wavelength MUX 310 of an RN 300b, the RN 300b additionally includes first through Nth optical power splitters 320-1 through 320-N. The first through Nth optical power splitters 320-1 through 320-N are connected to the optical wavelength MUX 310 so as to separately correspond to optical signals wavelength-divided by the optical wavelength MUX 310. Hereinafter, each of the first through Nth optical power splitters 320-1 through 320-N is representatively referred to as an optical power splitter 320.

Due to the optical power splitter 320, each downstream optical signal wavelength-divided by the optical wavelength MUX 310 is power-split so as to be separately transmitted to first through Mth ONUs 400-11 through 400-1M. Meanwhile, upstream optical signals transmitted from the first through Mth ONUs 400-11 through 400-1M are combined by the optical power splitter 320. The combined upstream optical signals are input to the optical wavelength MUX 310 and are wavelength-multiplexed together with other optical signals having different wavelengths by the optical wavelength MUX 310 so as to be transmitted to an OLT unit 200.

Meanwhile, a single feeder fiber is used, according to the current embodiment of the present invention, and thus an optical distributor 250 includes the second wavelength filter 252 illustrated in FIG. 1B. The other elements are identical to their corresponding elements illustrated in FIG. 1A and thus detailed descriptions thereof will be omitted here.

Figure 4:
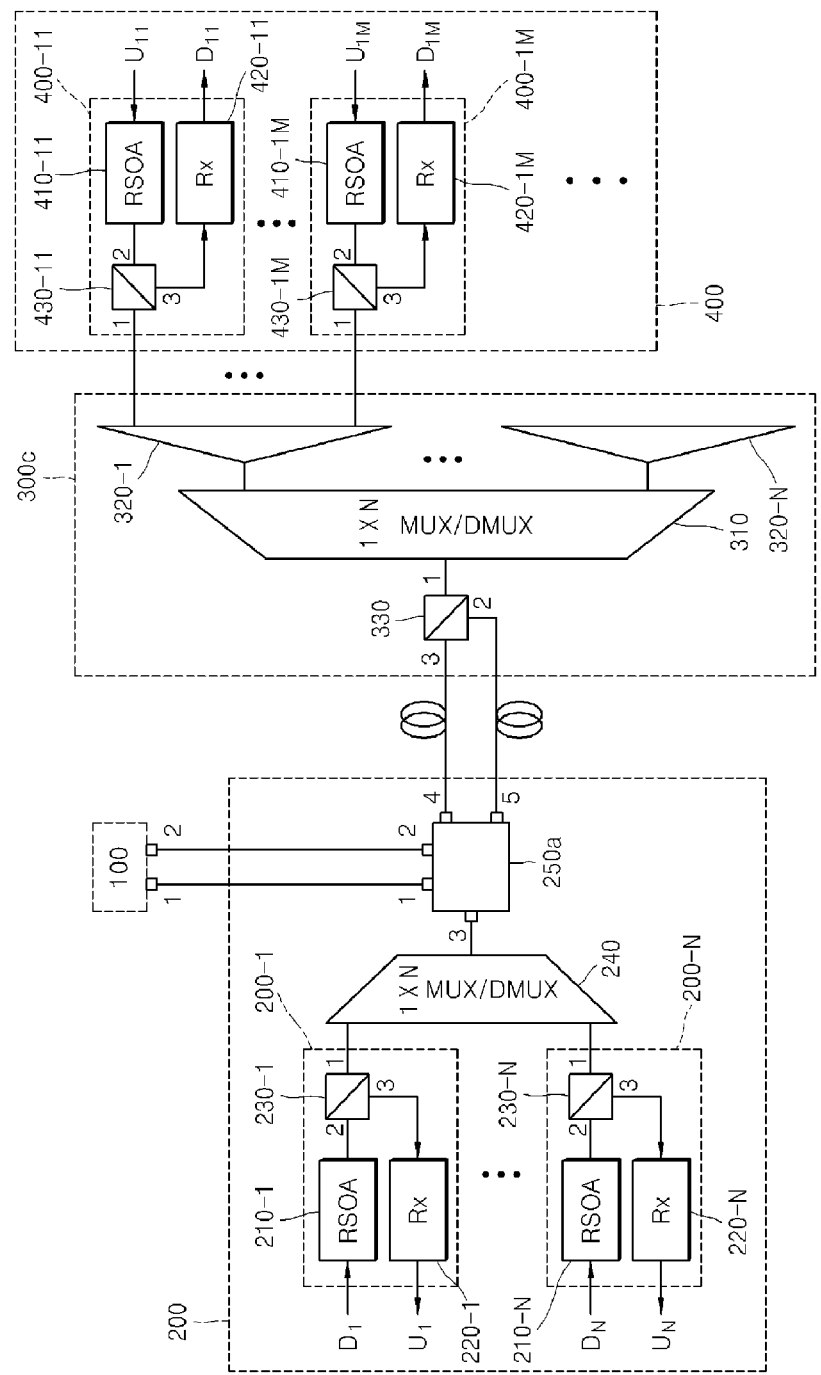
FIG. 4 is a structural block diagram of a WDM-PON in which additional external seed light is used for an OLT optical transmitter and an ONU optical transmitter, according to another embodiment of the present invention.

FIG. 4 is a structural block diagram of a WDM-PON in which additional external seed light is used for an OLT optical transmitter and an ONU optical transmitter, according to another embodiment of the present invention.

Referring to FIG. 4, the WDM-PON, according to the current embodiment of the present invention, has a similar structure to the WDM-PON illustrated in FIG. 3. However, a difference exists in that two separate feeder fibers are used. Thus, in this case, an RN 300c includes a wavelength filter 330 and an optical distributor 250a of an OLT unit 200 includes five ports and not a second wavelength filter.

Figure 5A:
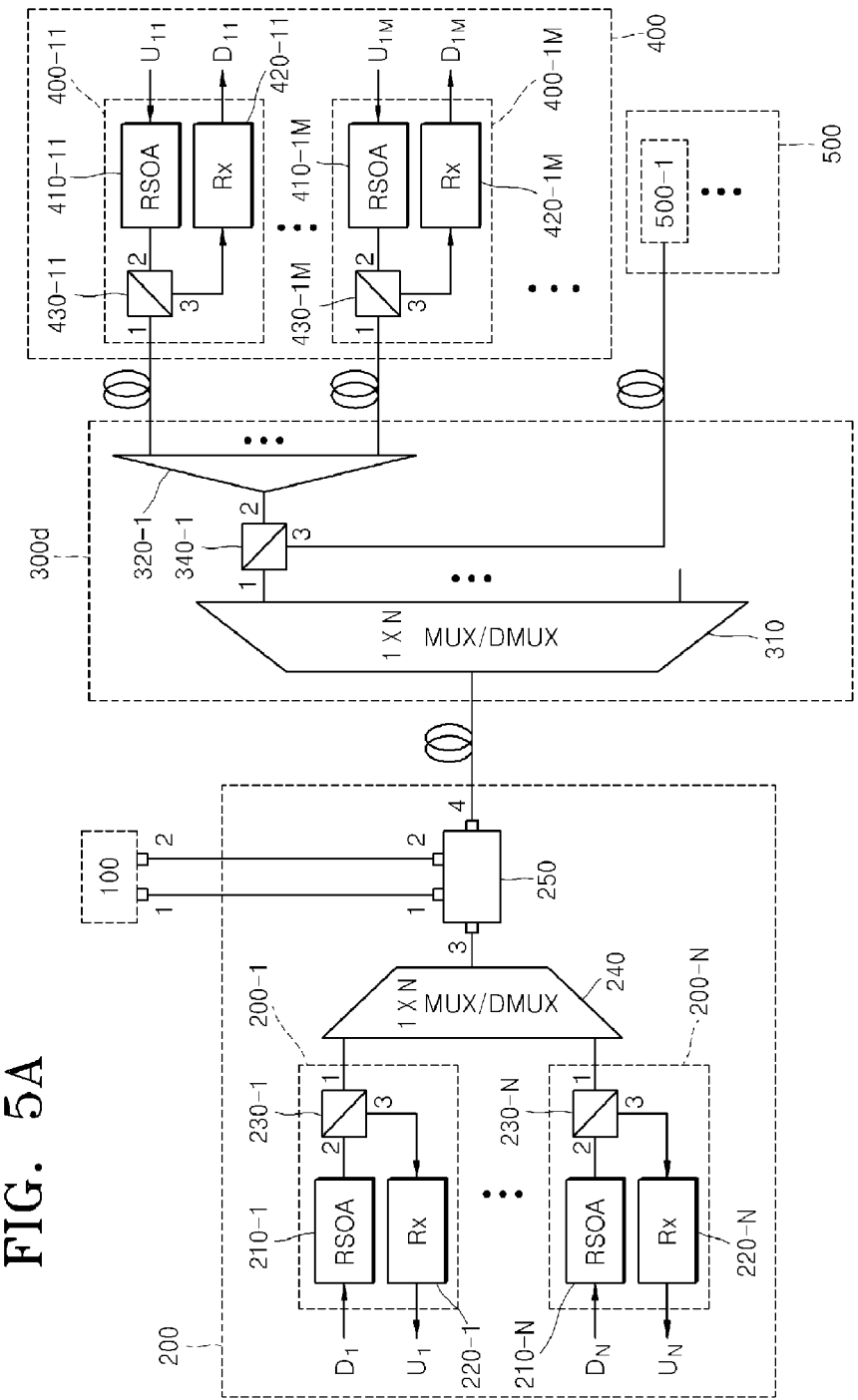
FIG. 5A is a structural block diagram of a WDM-PON in which additional external seed light is used for an OLT optical transmitter and an ONU optical transmitter, according to another embodiment of the present invention.

FIG. 5A is a structural block diagram of a WDM-PON in which additional external seed light is used for an OLT optical transmitter and an ONU optical transmitter, according to another embodiment of the present invention.

Referring to FIG. 5A, the WDM-PON according to the current embodiment of the present invention has a structure such that a conventional TDMA ONU can be used as an ONU unit 200. The WDM-PON illustrated in FIG. 5A has differences from the WDM-PON illustrated in FIG. 3 in that an RN 300d includes an optical wavelength MUX 310, first through Nth optical power splitters 320-1 through 320-N, and first through Nth wavelength filters 340-1 through 340-N. Meanwhile, a wavelength conversion device unit 500 including first through Nth wavelength conversion devices 500-1 through 500-N is located at a subscriber side. As illustrated in FIG. 5A, the first through Nth wavelength conversion devices 500-1 through 500-N are disposed so as to correspond to the first through Nth optical power splitters 320-1 through 320-N or the first through Nth wavelength filters 340-1 through 340-N. Hereinafter, each of the first through Nth optical power splitters 320-1 through 320-N is representatively referred to as an optical power splitter 320, each of the first through Nth wavelength filters 340-1 through 340-N is representatively referred to as a wavelength filter 340, and each of first through Nth wavelength conversion devices 500-1 through 500-N is representatively referred to as a wavelength conversion device 500-1.

Detailed operations of the RN 300d, and an ONU unit 400 and the wavelength conversion device unit 500, which are subscriber side devices, will now be described.

Wavelength-multiplexed downstream optical signals transmitted through a feeder fiber are input to the optical wavelength MUX 310 of the RN 300d so as to be wavelength-divided. A wavelength-divided downstream optical signal is input to a first port 1 of the wavelength filter 340, is output to a third port 3 of the wavelength filter 340, and is input to the wavelength conversion device 500-1. The input optical signal is wavelength-converted to have conventional time division multiple access-passive optical network (TDMA-PON) downstream wavelengths, and then is output.

The wavelength-converted downstream optical signal output from the wavelength conversion device 500-1 is input to the third port 3 of the wavelength filter 340, is output to a second port 2 of the wavelength filter 340, and is power-split by the optical power splitter 320 so as to be separately transmitted to first through Mth ONUs 400-11 through 400-1M of an ONU unit 400. A downstream optical signal input to each of the first through Mth ONUs 400-11 through 400-1M is input to a first port 1 of a wavelength filter 430, is output to a third port 3 of the wavelength filter 430, and is input to an optical receiver 420 so as to be converted into an electric signal.

An upstream optical signal transmitted from an optical transmitter 410 of the ONU unit 400 is input to the second port 2 of the wavelength filter 430, is output to the first port 1 of the wavelength filter 430, and is combined with upstream optical signals output from the other optical transmitters. The combined upstream optical signals are input to the second port 2 of the wavelength filter 340 and are output to the third port 3 of the wavelength filter 340. The output upstream optical signals are input to the wavelength conversion device 500-1, are wavelength-converted to have DWDM upstream wavelengths, and then are output. The wavelength-converted upstream optical signals are input to the third port 3 of the wavelength filter 340 of the RN 300d, are output to the first port 1 of the wavelength filter 340, and are input to the optical wavelength MUX 310. The upstream optical signals are wavelength-multiplexed together with other upstream optical signals by the optical wavelength MUX 310 so as to be transmitted to an OLT unit 200 through the feeder fiber.

Figure 5B:
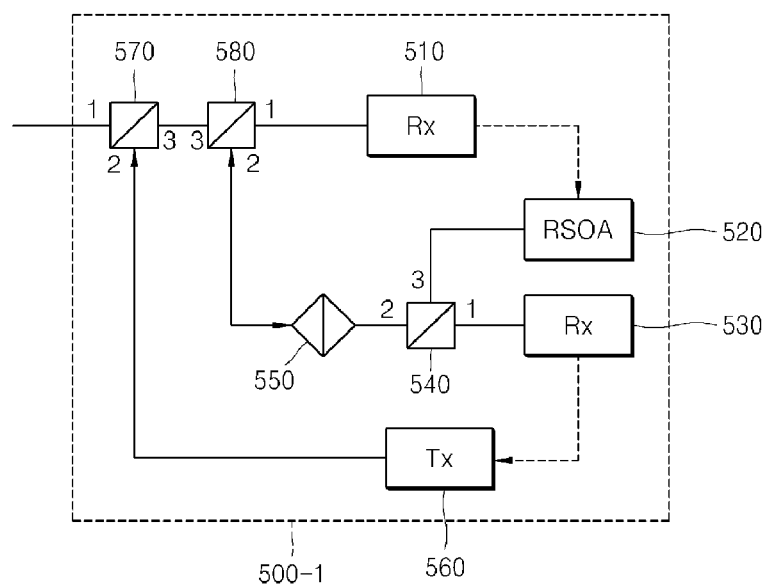
FIG. 5B is a detailed structural diagram of a wavelength conversion device illustrated in FIG. 5A.

Meanwhile, seed light transmitted from an upstream seed light source module 100-2 is input to a second port 2 of an optical distributor 250, is output to a fourth port 4 of the optical distributor 250, and is input to the optical wavelength MUX 310 of the RN 300d through the feeder fiber so as to be wavelength-divided. The wavelength-divided seed light is input to the first port 1 of the wavelength filter 340 and is output to the third port 3 of the wavelength filter 340. The output seed light is input to the wavelength conversion device 500-1 and is provided to a first optical transmitter 520 included in the wavelength conversion device 500-1 and that may be an RSOA, as illustrated in FIG. 5B.

In more detail, a DWDM optical signal input to the first port 1 of the wavelength filter 340 of the RN 300d is output to the third port 3 of the wavelength filter 340, is wavelength-converted to have TDMA-PON downstream wavelengths by the wavelength conversion device 500-1, and then is input to the third port 3 of the wavelength filter 340 so as to be output to the second port 2 of the wavelength filter 340.

Also, a TDMA-PON upstream optical signal input to the second port 2 of the wavelength filter 340 of the RN 300d, is output to the third port 3 of the wavelength filter 340, is wavelength-converted to have TDMA upstream optical wavelengths by the wavelength conversion device 500-1, and then is input to the third port 3 of the wavelength filter 340 so as to be output to the first port 1 of the wavelength filter 340.

Meanwhile, DWDM upstream seed light input to the first port 1 of the wavelength filter 340 of the RN 300d is output to the third port 3 of the wavelength filter 340 and is input to the first optical transmitter 520 that may be an RSOA and is included in the wavelength conversion device 500-1.

FIG. 5B is a detailed structural diagram of the wavelength conversion device 500-1 illustrated in FIG. 5A. FIG. 5B will be described in conjunction with FIG. 5A.

Referring to FIG. 5B, the wavelength conversion device 500-1 includes a first wavelength filter 570, a second wavelength filter 580, a third wavelength filter 540, a first optical transmitter 520, a second optical transmitter 560, a first optical receiver 530, a second optical receiver 510, and a bidirectional optical amplifier 550.

Detailed operations of the wavelength conversion device 500-1 will now be described.

Downstream seed light having DWDM wavelengths is input to a first port 1 of the first wavelength filter 570, is output to a third port 3 of the first wavelength filter 570, is input to a third port 3 of the second wavelength filter 580, is output to a second port 2 of the second wavelength filter 580, is input to a second port 2 of the third wavelength filter 540 through the bidirectional optical amplifier 550, is output to a first port 1 of the third wavelength filter 540, and is input to the first optical receiver 530 so as to be converted into an electric signal.

The electric signal of the first optical receiver 530 is input to the second optical transmitter 560, is converted to have TDMA-PON downstream wavelengths, is output from the second optical transmitter 560, is input to a second port 2 of the first wavelength filter 570, and is output to the first port 1 of the first wavelength filter 570.

Upstream seed light having DWDM wavelengths is input to the first port 1 of the first wavelength filter 570, is output to the third port 3 of the first wavelength filter 570, is input to the third port 3 of the second wavelength filter 580, is output to the second port 2 of the second wavelength filter 580, is input to the second port 2 of the third wavelength filter 540 through the bidirectional optical amplifier 550, is output to a third port 3 of the third wavelength filter 540, and is input to the first optical transmitter 520 that may be an RSOA.

An upstream optical signal having TDMA-PON wavelengths is input to the first port 1 of the first wavelength filter 570, is output to the third port 3 of the first wavelength filter 570, is input to the third port 3 of the second wavelength filter 580, is output to a first port 1 of the second wavelength filter 580, and is input to the second optical receiver 510 so as to be converted into an electric signal. The electric signal of the second optical receiver 510 is input to the first optical transmitter 520, is converted to have wavelengths of the upstream seed light, is output from the first optical transmitter 520, is input to the third port 3 of the third wavelength filter 540, is output to the second port 2 of the third wavelength filter 540, is input to the second port 2 of the second wavelength filter 580 through the bidirectional optical amplifier 550, is output to the third port 3 of the second wavelength filter 580, is input to the third port 3 of the first wavelength filter 570, and is output to the first port 1 of the first wavelength filter 570.

Although the wavelength conversion device 500-1 according to the current embodiment includes the bidirectional optical amplifier 550, the bidirectional optical amplifier 550 may not be included in accordance with the transmission distances of upstream and downstream optical signals.

Figure 5C:
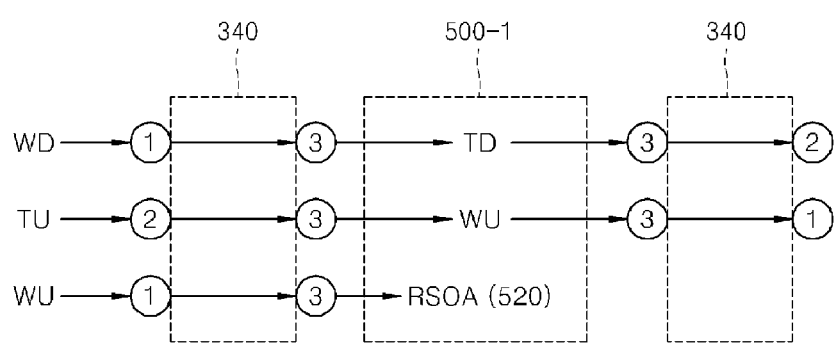
FIG. 5C is a structural diagram showing the flow of optical signals between a wavelength filter and the wavelength conversion device illustrated in FIG. 5A.

FIG. 5C is a structural diagram showing the flow of optical signals between the wavelength filter 340 and the wavelength conversion device 500-1 illustrated in FIG. 5A. FIG. 5C will be described in conjunction with FIG. 5A.

Referring to FIG. 5C, initially, a downstream optical signal having DWDM wavelengths is input to the wavelength conversion device 500-1 through the first port 1 and the third port 3 of the wavelength filter 340 of the RN 300d, is converted to have TDMA-PON wavelengths, and then is transmitted to the ONU unit 400 through the third port 3 and the second port 2 of the wavelength filter 340.

Then, an upstream optical signal having TDMA-PON wavelengths is input to the wavelength conversion device 500-1 through the second port 2 and the third port 3 of the wavelength filter 340, is converted to have DWDM wavelengths, and then is transmitted to the OLT unit 200 through the third port 3 and the first port 1 of the wavelength filter 340.

Lastly, upstream seed light having DWDM wavelengths is input to the first optical transmitter 520 that may be an RSOA, through the first port 1 and the third port 3 of the wavelength filter 340, and is used as seed light for upstream signals.

Figure 6:
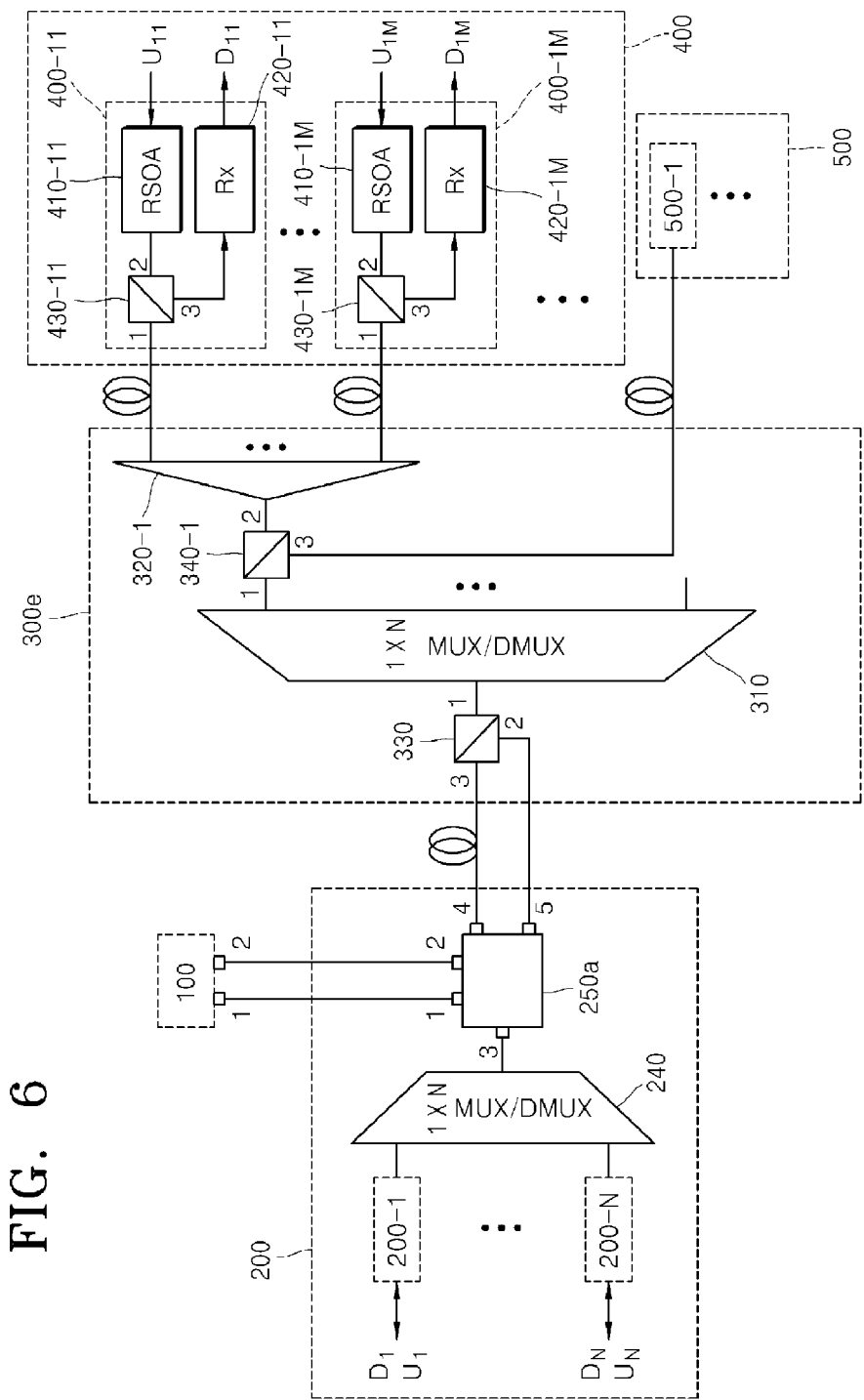
FIG. 6 is a structural block diagram of a WDM-PON in which additional external seed light is used for an OLT optical transmitter and an ONU optical transmitter, according to another embodiment of the present invention.

FIG. 6 is a structural block diagram of a WDM-PON in which additional external seed light is used for an OLT optical transmitter and an ONU optical transmitter, according to another embodiment of the present invention.

Referring to FIG. 6, the WDM-PON according to the current embodiment of the present invention has a similar structure to the WDM-PON illustrated in FIG. 5A. However, a difference exists in that two separate feeder fibers are used. Thus, in this case, an RN 300e includes a wavelength filter 330 and an optical distributor 250a of an OLT unit 200 includes five ports and not a second wavelength filter.

Figure 7A:
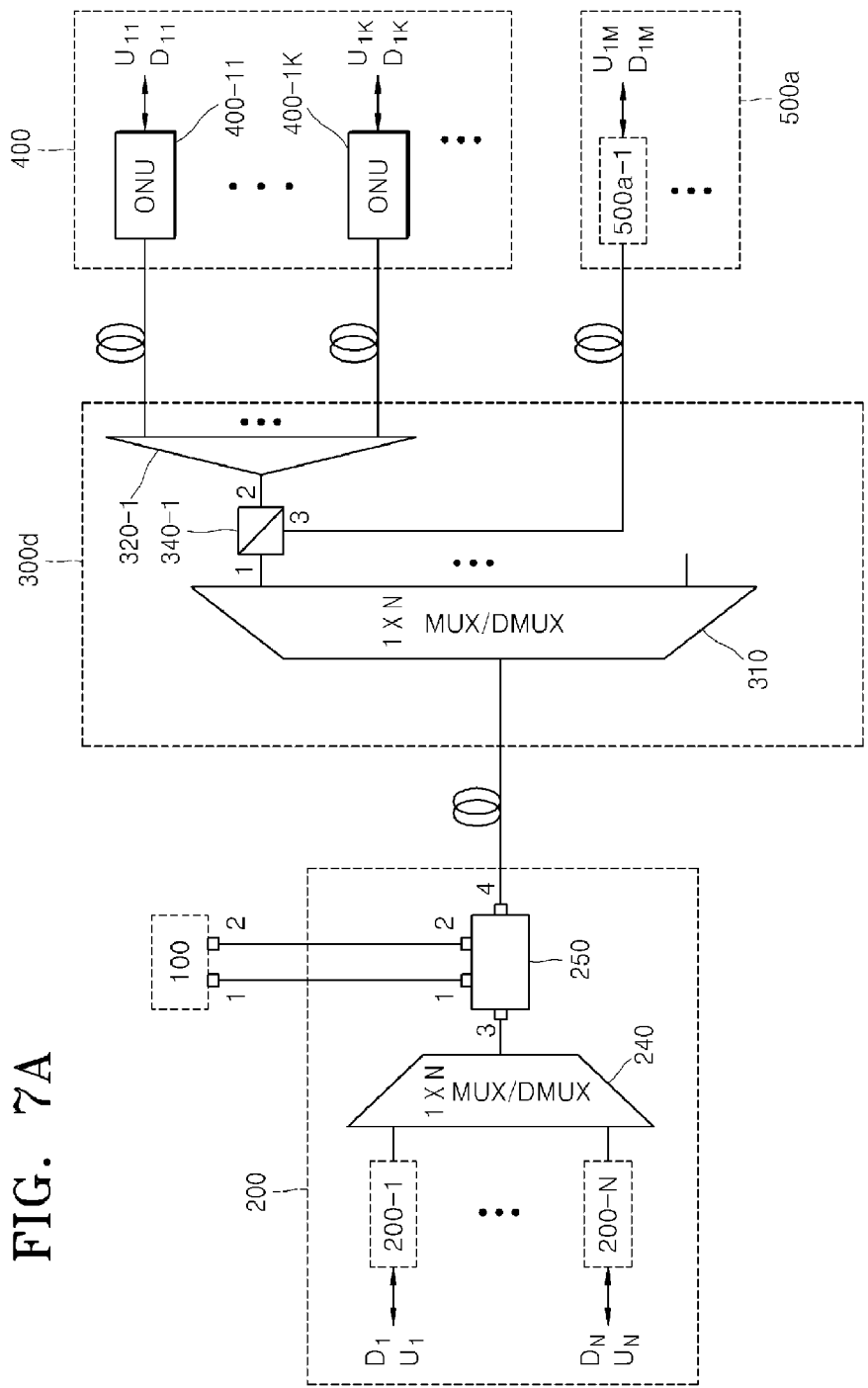
FIG. 7A is a structural block diagram of a WDM-PON in which additional external seed light is used for an OLT optical transmitter and an ONU optical transmitter, according to another embodiment of the present invention.

FIG. 7A is a structural block diagram of a WDM-PON in which additional external seed light is used for an OLT optical transmitter and an ONU optical transmitter, according to another embodiment of the present invention.

Referring to FIG. 7A, the WDM-PON according to the current embodiment of the present invention has a structure such that a predetermined ONU located at a subscriber side is used in conjunction with a wavelength conversion device 500a-1. The WDM-PON illustrated in FIG. 7A has a similar structure to the WDM-PON illustrated in FIG. 5A. However, a difference exists in a structure of the wavelength conversion device 500a-1. Thus, descriptions on identical elements will be omitted here and the wavelength conversion device 500a-1 will be described in detail with reference to FIG. 7B.

Figure 7B:
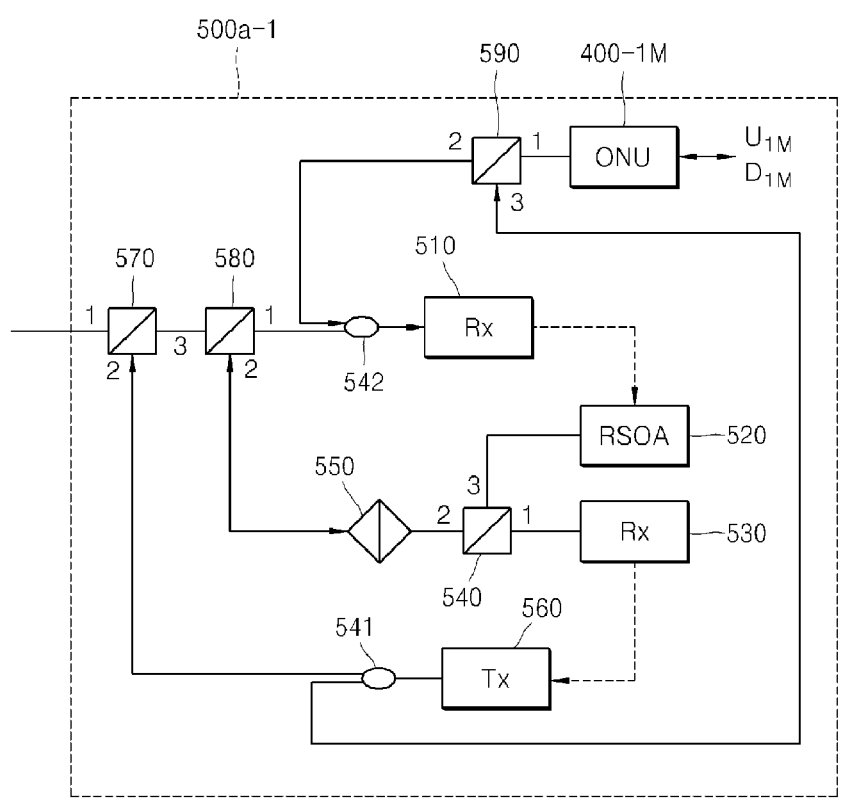
FIG. 7B is a detailed structural diagram of a wavelength conversion device illustrated in FIG. 7A.

FIG. 7B is a detailed structural diagram of the wavelength conversion device 500a-1 illustrated in FIG. 7A. FIG. 7B will be described in conjunction with FIG. 5B.

Referring to FIG. 7B, the wavelength conversion device 500a-1 further includes a first optical coupler 541, a second optical coupler 542, and a fourth wavelength filter 590, in addition to the elements included in the wavelength conversion device 500-1 illustrated in FIG. 5B Descriptions already made for the elements in FIG. 5B will be omitted here and additional operations of the wavelength conversion device 500a-1 will now be described.

An upstream optical signal having TDMA-PON wavelengths, which is transmitted from a predetermined ONU 400-1M from among a plurality of ONUs connected to an optical power splitter 320 illustrated in FIG. 7A, is input to a first port 1 of the fourth wavelength filter 590, is output to a second port 2 of the fourth wavelength filter 590, is input to the second optical coupler 542, and is combined with other upstream optical signals having TDMA-PON wavelengths and transmitted from the first port 1 of the second wavelength filter 580, so as to be input to the second optical receiver 510.

Meanwhile, a downstream optical signal having TDMA-PON wavelengths and output from the second optical transmitter 560, is power-split in the first optical coupler 541, and some power-split optical signals are input to the second port 2 of the first wavelength filter 570 and the other power-split optical signals are input to a third port 3 of the fourth wavelength filter 590, are output to the first port 1 of the fourth wavelength filter 590, and are input to the predetermined ONU 400-1M so as to be converted into electric signals.

Figure 8:
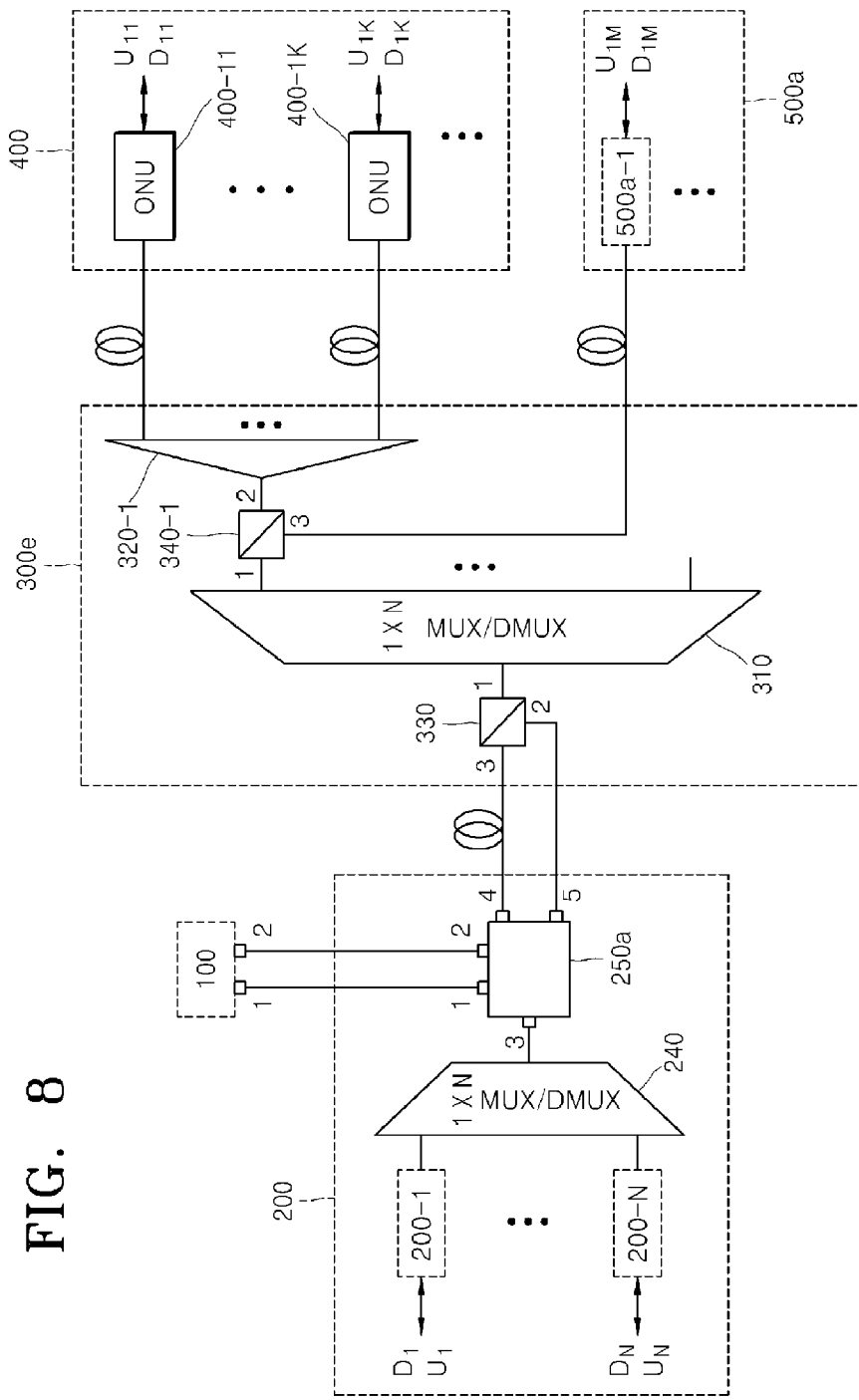
FIG. 8 is a structural block diagram of a WDM-PON in which additional external seed light is used for an OLT optical transmitter and an ONU optical transmitter, according to another embodiment of the present invention.

FIG. 8 is a structural diagram of a WDM-PON in which additional external seed light is used for an OLT optical transmitter and an ONU optical transmitter, according to another embodiment of the present invention.

Referring to FIG. 8, the WDM-PON according to the current embodiment of the present invention has a similar structure to the WDM-PON illustrated in FIG. 7A. However, a difference exists in that two separate feeder fibers are used. Thus, in this case, an RN 300e includes a wavelength filter 330 and an optical distributor 250a of an OLT unit 200 includes five ports and not a second wavelength filter.

As described above, a WDM-PON using an external seed light source, according to the present invention, uses an RSOA as an optical transmitter of each of an OLT and an ONU and injects the spectrum-sliced light into the RSOA of each of the OLT and the ONU, from a seed light source module located in a base station, and thus, may solve the problems that downstream information included in a modulated downstream optical signal cannot be completely removed in an ONU and components of the downstream optical signal, which remain in an upstream optical signal, can deteriorate a quality of upstream data transmission. That is, an ideal wavelength-independent WDM-PON may be implemented.

Furthermore, a WDM-PON using an external seed light source, according to the present invention, may increase the number of ONUs by using an optical power splitter and may use conventional TDMA ONUs by using a wavelength conversion device.

While the present invention has been particularly shown and described with reference to exemplary embodiments thereof, it will be understood by one of ordinary skill in the art that various changes in form and details may be made therein without departing from the spirit and scope of the present invention as defined by the following claims.

Mode for Invention

Industrial Applicability

The present invention relates to optical communication, and more particularly, to a wavelength division multiplexing-passive optical network (WDM-PON). The WDM-PON using an external seed light source, according to the present invention, uses an RSOA as an optical transmitter of each of an OLT and an ONU and injects the spectrum-sliced light into the RSOA of each of the OLT and the ONU, from a seed light source module located in a base station, and thus, may solve the problems that downstream information included in a modulated downstream optical signal cannot be completely removed in an ONU and components of the downstream optical signal, which remain in an upstream optical signal, can deteriorate a quality of upstream data transmission. That is, an ideal wavelength-independent WDM-PON may be implemented.

Sequence List Text

The invention claimed is:

1. A wavelength division multiplexing-passive optical network (WDM-PON) comprising:
   an optical line termination (OLT) unit which is located in a base station, transmits downstream optical signals to a subscriber side, and receives upstream optical signals transmitted from the subscriber side;
   an optical network unit (ONU) unit which is located at the subscriber side, receives the downstream optical signals from the OLT unit, and transmits the upstream optical signals to the OLT unit;
   a seed light source module which is located in the base station and separated from the OLT, and includes a downstream seed light source module that provides spectrum-sliced and wavelength-multiplexed seed light to the OLT unit, and an upstream seed light source module that provides spectrum-sliced and wavelength-multiplexed seed light to the ONU unit;
   a remote node (RN) which wavelength-divides the downstream optical signals transmitted from the OLT unit so as to output the wavelength-divided downstream optical signals to the ONU unit, and wavelength-multiplexes the upstream optical signals transmitted from the ONU unit so as to output the wavelength-multiplexed upstream optical signals to the OLT unit; and
   a wavelength conversion device which is located at the subscriber side, wavelength-converts the downstream optical signals to have time division multiple access-passive optical network (TDMA-PON) downstream wavelengths, and outputs the wavelength-converted downstream optical signals to the ONU unit,
   wherein optical transmitters of the OLT unit and the ONU unit respectively generate the downstream and upstream optical signals by using the seed light.

2. The WDM-PON of claim 1, wherein the RN comprises:
   an optical wavelength multiplexer (MUX) which wavelength-divides the downstream optical signals which are wavelength-multiplexed and are received from the OLT unit and wavelength-multiplexes the upstream optical signals which have different wavelengths and are received from the ONU unit; and
   a wavelength filter which receives the downstream optical signals which are wavelength-divided by the optical wavelength MUX so as to output the downstream optical signals to the wavelength conversion device or receives the upstream optical signals from the ONU unit so as to output the upstream optical signals to the wavelength conversion device, and receives the downstream or upstream optical signals which are wavelength-converted by the wavelength conversion device to have TDMA-PON wavelengths or WDM-PON wavelengths so as to transmit the wavelength-converted downstream or upstream optical signals to the ONU unit or the optical wavelength MUX.

3. The WDM-PON of claim 2, wherein the RN further comprises an optical power splitter which is located between the wavelength filter and the ONU unit, power-splits the downstream optical signals output from the wavelength filter so as to transmit the power-split downstream optical signals to at least two optical transceivers of the ONU unit, and combines upstream optical signals transmitted from the at least two optical transceivers of the ONU unit so as to input the combined upstream optical signals to the wavelength filter.

4. The WDM-PON of claim 2, wherein the wavelength conversion device comprises:
   a first wavelength filter which is connected to the wavelength filter of the RN;
   a second wavelength filter which is connected to the first wavelength filter;
   a third wavelength filter which is connected to the second wavelength filter;
   a first optical transmitter and a first optical receiver which are connected to the third wavelength filter;
   a second optical transmitter which is connected to the first wavelength filter and the first optical receiver; and
   a second optical receiver which is connected to the second wavelength filter and the first optical transmitter,
   wherein each of the first and second optical transmitters is a reflective semiconductor optical amplifier (RSOA).

5. The WDM-PON of claim 4, wherein the downstream optical signals transmitted from the RN are input to the first optical receiver through the first, second, and third wavelength filters of the wavelength conversion device so as to be converted into electric signals, the electric signals converted by the first optical receiver are input to the second optical transmitter so as to be wavelength-converted to have TDMA- PON wavelengths, and the wavelength-converted electric signals are output to the RN through the first wavelength filter,
  wherein seed light for the upstream optical signals input from the RN is input to the first optical transmitter through the first, second, and third wavelength filters, and
  wherein upstream optical signals having TDMA-PON wavelengths, which are input from the RN, are input to the second optical receiver through the first and second wavelength filters so as to be converted into electric signals, the electric signals converted by the second optical receiver are input to the first optical transmitter so as to be wavelength-converted to have wavelengths of the seed light, and the wavelength-converted electric signals are output to the RN through the third, second, and first wavelength filters.

6. The WDM-PON of claim 5, wherein the wavelength conversion device further comprises a bidirectional optical amplifier which is located between the second and third wavelength filters and amplifies and outputs an input optical signal in two directions.

7. The WDM-PON of claim 2, wherein the ONU unit comprises at least two optical transceivers, and
  wherein the wavelength conversion device is connected to one of the two optical transceivers.

8. The WDM-PON of claim 7, wherein the optical transceiver comprises:
  an optical transmitter transmitting the upstream optical signals having upstream data;
  an optical receiver receiving the downstream optical signals; and
  a wavelength filter dividing the upstream and downstream optical signals from each other, and
  wherein the wavelength conversion device comprises:
  a first wavelength filter which is connected to the wavelength filter of the RN;
  a second wavelength filter and a first optical coupler which are connected to the first wavelength filter;
  a second optical coupler and a third wavelength filter which are connected to the second wavelength filter;
  a first optical transmitter and a first optical receiver which are connected to the third wavelength filter;
  a second optical transmitter which is connected to the first optical coupler and the first optical receiver;
  a second optical receiver which is connected to the second optical coupler and the first optical transmitter, and
  a fourth wavelength filter which is connected to the first and second optical couplers and the optical transceiver,
  wherein each of the first and second optical transmitters is an RSOA.

9. The WDM-PON of claim 8, wherein, if the RN comprises an optical power splitter,
  the optical transceiver connected to the fourth wavelength filter is a predetermined optical transceiver which is selected from among a plurality of optical transceivers connected to the same optical power splitter,
  an upstream optical signal having TDMA-PON wavelengths, which is output from the predetermined optical transceiver, is input to the second optical coupler through the fourth wavelength filter, and is combined with other upstream optical signals having TDMA-PON wavelengths, which are output from the second wavelength filter, so as to be input to the second optical receiver, and
  a downstream optical signal having TDMA-PON wavelengths, which is output from the second optical transmitter, is power-split by the first optical coupler, some power-split optical signals are input to the RN through the first wavelength filter, and the other power-split optical signals are input to the predetermined optical transceiver through the fourth wavelength filter, so as to be converted into electric signals.

10. The WDM-PON of claim 1, wherein the OLT unit and the RN are connected to each other with a single feeder fiber or two feeder fibers.

11. The WDM-PON of claim 10, wherein the OLT unit comprises an optical distributor which divides the seed light so as to transmit the divided seed light to the optical transmitters of the OLT unit and the optical transmitters of the ONU unit, transmits the downstream optical signals, which are transmitted from the OLT unit, to the ONU unit, and transmits the upstream optical signals, which are transmitted from the ONU unit, to the OLT unit,
  wherein, if the OLT unit and the RN are connected to each other with a single feeder fiber, the optical distributor comprises:
  a first wavelength filter which is connected to the optical wavelength MUX of the OLT unit;
  a second wavelength filter which is connected to the RN;
  a first optical circulator which is located between the first and second wavelength filters and is connected to the first and second wavelength filters and a downstream seed light source module of the seed light source module; and
  a second optical circulator which is located between the first and second wavelength filters and is connected to the first and second wavelength filters and an upstream seed light source module of the seed light source module, and
  wherein, if the OLT unit and the RN are connected to each other with two feeder fibers, the optical distributor comprises:
  a first wavelength filter which is connected to the optical wavelength MUX of the OLT unit;
  a first optical circulator which is connected to the first wavelength filter, the downstream seed light source module, and one of the two feeder fibers; and
  a second optical circulator which is connected to the first wavelength filter, the upstream seed light source module, and the other one of the two feeder fibers.

* * * * *